Patented Jan. 1, 1952

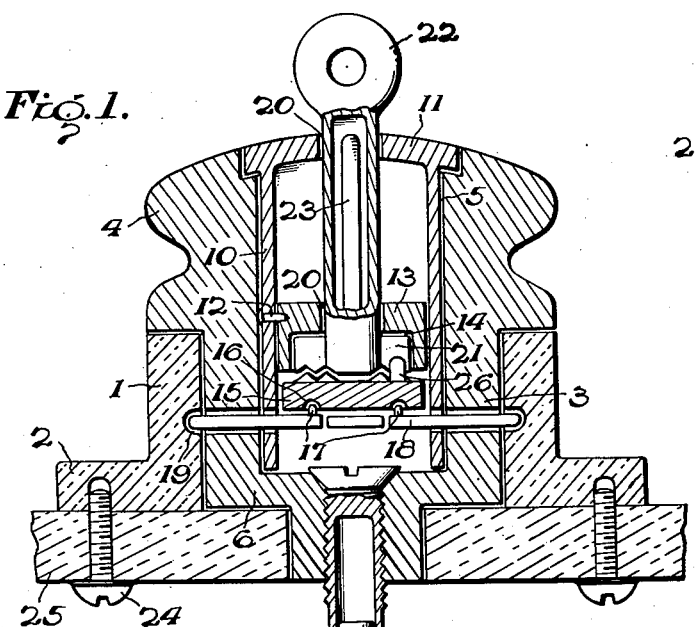

2,580,894

UNITED STATES PATENT OFFICE 2,580,894

LOCKING DEVICE FOR LOCKING SHAFTS AGAINST ROTATION

Felix de Hoffmann, Buenos Aires, Argentina

Application December 22, 1947, Serial No. 793,113
In Argentina September 12, 1947

3 Claims. (Cl. 70—216)

The present invention refers to a locking arrangement applicable to rotating shafts and similar elements, its main object being to provide a device of the type specified which, owing to its excellent structural and functional features, offers obvious advantages over all other devices and apparatus which, with the same or a similar purpose, have been proposed and used to date.

The object of the present invention may be advantageously adapted to several purposes, such as, for example, fixing in any position the tuning control shaft of a radio receiving apparatus, so as to limit reception to certain stations; as in the embodiment of the invention, although in general the same may be applied to the purpose of immobilizing a control shaft of any mechanism or machine.

The invention likewise contemplates other accessory objects that will be made clear in the course of the present description.

In order that the invention may be clearly understood and readily put into effect, same will now be described with reference to the accompanying drawing, illustrating preferred embodiments of same and in which:

Figure 1 is a diametral section of the locking device, in one of its preferred embodiments;

Figure 2 is a front view of the lock drum, as well as the inlet opening for the corresponding key;

Figure 3, another diametral section, shows a variation of the same device and, finally, Figure 4 is a partial diametral section illustrating another modification of the device.

Like numerals represent like or similar parts throughout the several figures of the drawing.

In the embodiment shown in Figure 1, the device according to the present invention comprises mainly a tubular base 1, provided with a flange 2; inside of this tubular base 1 a cylindrical body 3 is rotatable for adjustment, having as an integral part knob 4, this latter element, and its extension, being provided with a bore 5 which is of cylindrical section and runs partially through said knob and its prolongation, in an axial direction.

Said cylindrical body 3 is closed at its free end by a bottom portion 6 into which a tubular bushing 7 is threadedly or otherwise secured. This tubular bushing 7 is capable of being coupled to shaft 8 (provided for the tuning control of a radio-receiving apparatus) by means of a cotter or similar arrangement 9.

From the figure it can be seen, furthermore, that a cylindrical bushing 10 is fixedly adjusted to the inside portion of bore 5. This bushing 10 is closed at its top end 11 and is, in turn, interiorly provided, by screws or similar means 12, with a disc 13 the lower face of which has a recess 14.

Beneath said disc 13 a rotatable disc 15 is arranged, the internal face of which is provided with slots 16 in which are housed small stems or projections 17 provided at the ends of latches 18, respectively, said latches being capable of a tight-fitting displacement within radial slots which extend through body 3 and internal bushing 10, so as to enter notches 19 provided at appropriate points of tubular base 1.

From Figures 1 and 2 it can be seen, furthermore, that top 11 of tubular bushing 10, as well as fixed internal disc 13, are centrally provided with perforations 20 from which two radial slots 20' run in opposite directions for the reception of radial leaves 21 of a key 22 until such leaves lodge within recess 14 of said fixed disc, as is shown in detail in Figure 1. If preferred, rotating disc 15 may be provided with a stem 23 axially extending from the outer face of same and serving to guide said key 22.

The device as described is fixed through screws or similar means 24 to the front panel 25 of the corresponding radio receiving apparatus and in these conditions is coupled to tubular bushing 7 of tuning control shaft 8 by means of a cotter pin or similar arrangement 9, in such a manner that the turning motion manually imparted to knob 4 will be transmitted directly to said shaft 8.

If at any given moment it be desired to fix said shaft 8 in a certain position, in order to limit reception to any one receiving station, key 22 is inserted and made to pass through bores 20 and radial slots 20' until reaching the position shown in Figure 1. Thus placed, said key is turned, so that leaves 21 of same collide against similar leaves or projections 26 provided on the upper face of movable disc 15, thus causing this latter member to turn, whereby eccentric slots 16, by teeth or projections 17, will bring about the outward displacement of latches 18 which, on entering slots or notches 19 of tubular base 1, as is shown in Figure 1, will effectively prevent the assembly from rotating, until such a time as said latches are again drawn inwardly by operation of the corresponding key 22.

By suitable arrangement of recesses 19 at certain points in tubular base 1, shaft 8 can be fixed in any one of several predetermined positions, according to the transmitting stations it be desired to select.

The modification shown in Figure 3 is based on the fact that internal bushing 10 having a top 11a is in this case slideably mounted within bore 5 and is pushed outwardly by spring 27 pressure-adjusted within a widened portion 28 provided in the extension, said outward displacement being limited by a key 29 slideably adjusted in a slot or notch 29' which extends through slideable bushing 10.

In this modified embodiment of the invention, internal bushing 10 is provided with a bottom wedge portion 30 to which the end of a guide stem 23a can be threaded, said stem being capable of exerting a wedge action against heads 31 of respective latches 32 capable of adjustment within keeper recesses 19 provided in tubular base 1 and which normally are drawn inwardly by springs 33.

In order to put this device in an operating position, it is not necessary to use key 22, it being merely required to push in slideable bushing 10, counteracting the force exerted by spring 27. End 30 of said bushing, acting after the manner of a wedge, will thereby press against heads 31 of latches 32, causing same to be displaced radially and outwardly, being thus locked in the recesses 19 of base 1 and thus preventing, as in the former case, any later rotation by shaft 8. During this advancing movement of slideable bushing 10, latches 18a will enter respective notches 34 provided in heads 31, thus preventing the return movement of said bushing 10 through spring action exerted by member 27.

In order to unlock the mechanism, key 22 is operated so as to turn movable disc 15 and thus drag inwardly latches 18a, causing them to leave slots 34 and allowing bushing 10, to be displaced outwardly by spring 27 until again occupying the position indicated in Figure 3. Simultaneously, springs 33 displace latches 32 inwardly, causing them to leave slots 19 of tubular bushing 1 and thus perfectly unlocking the mechanism.

The variation shown in Figure 4 resides in the fact that key 22 is equipped with a side leaf 21' notched and cut in agreement with equivalent notches and cuts provided within tubular bushing 13'; their exact coincidence being the only manner in which the key may be turned, said bushing being internally provided with a lengthwise slot 13' the purpose of which is to allow key 22 to be inserted in its operative position.

The invention as described may be clearly understood, and no further explanations will be required by those versed in the matter.

It is evident that various modifications as to build and detail may be introduced without thereby departing from the essential nature of this invention, as clearly defined in the following claims.

I claim:

1. A locking device for control shafts and the like, comprising, a tubular base having at least one keeper recess opening through the interior surface thereof, a knob rotatable in the base and having shaft coupling means at its inner end, latch means mounted in the knob for radial movement thereof and in a certain angular position of the knob adapted to be projected into the keeper, said latch means normally spring urged inwardly to a position substantially flush with the peripheral surface of the knob, a bushing slidable axially in the knob and spring urged outwardly to a predetermined position, said bushing having a key opening in its outer end, a wedge formation at the inner end of the bushing and cooperating with the first latch means to push the same into said keeper recess when the bushing is pushed inwardly, to lock the knob to the base plate means rotatable within the bushing and including eccentric guide means, second latch means having portions engaged by said guide means, and movable transversely of the bushing upon rotation of the plate means adapted to engage the first latch means when the bushing is pushed inwardly and thereby hold the bushing in an inwardly disposed position.

2. The device according to claim 1 and wherein the first latch means has at its inner end at least one notch receiving the second latch means on axial inward movement of the bushing.

3. The device according to claim 1 and wherein the inner end portion of the bushing carries a guide for the key and the plate means has an aperture for the key guide.

FELIX DE HOFFMANN.

REFERENCES CITED

The following references are of record in the file of this patent:

UNITED STATES PATENTS

| Number | Name | Date |
|---|---|---|
| 614,732 | Leseman et al. | Nov. 22, 1898 |
| 956,759 | Clouse | May 3, 1910 |
| 1,402,104 | Soss | Jan. 3, 1922 |
| 1,477,342 | Gates | Dec. 11, 1923 |
| 1,586,246 | Kirchner et al. | May 25, 1926 |
| 2,117,203 | Muro | May 10, 1938 |
| 2,226,499 | Ledin | Dec. 24, 1940 |
| 2,291,217 | Hoecker | July 28, 1942 |